DATA PROCESSING APPARATUS

Filed Sept. 21, 1961 4 Sheets-Sheet 1

JAMES D. GIAMBAZI
INVENTOR.

BY Weingarten, Orenbuch & Pandiscio
ATTORNEYS.

DATA PROCESSING APPARATUS

JAMES D. GIAMBAZI
INVENTOR.

BY Weingarten, Orenbuch & Pandiscio
ATTORNEYS.

DATA PROCESSING APPARATUS

Filed Sept. 21, 1961 4 Sheets-Sheet 3

JAMES D. GIAMBAZI
INVENTOR.

BY Weingarten, Orenbuch & Pandiscio
ATTORNEYS.

DATA PROCESSING APPARATUS

Filed Sept. 21, 1961 4 Sheets-Sheet 4

JAMES D. GIAMBAZI
INVENTOR.

BY Weingarten, Orenbuch & Pandiscio
ATTORNEYS.

United States Patent Office 3,240,210 Patented Mar. 15, 1966

3,240,210
DATA PROCESSING APPARATUS

James D. Giambazi, Manville, R.I., assignor to Itek Corporation, Lexington, Mass., a corporation of Delaware Filed Sept. 21, 1961, Ser. No. 139,764
1 Claim. (Cl. 129—16.1)

This invention relates to data processing apparatus and more particularly to an improved card system for information handling.

As is well known, various approaches have been taken to facilitate selection and withdrawal of data-bearing cards from a storage file. A representative cross-section of the various systems which have been conceived is provided by the following United States Patents: 1,889,635; 2,002,808; 2,492,706; 2,544,251; 2,602,451; 2,638,098; and 2,647,519. Notwithstanding the value of prior systems I have observed a need for an improved system which better meets the basic requirements determined by present day information handling tasks. Among these basic requirements are high speed in selection and withdrawal of individual cards, simplicity of apparatus, functional reliability, high data storage capacity, and high identification code storage capacity.

The present invention has as its primary object the provision of a card filing and selection system which satisfies all of the foregoing basic requirements, particularly identification code storage capacity, to a degree which commands its use for current and contemplated information handling projects.

Briefly, the present system involves the use of a file of data-bearing cards individually coded along their top edges in a manner hereinafter described which provides for exceptional identification code capacity. Although the cards are disposed at random in the file, individual cards can be automatically selected and separated by means of individually operable selector bars acting in concert with the coded top edges. Cooperating with the selector bars to effect selective removal of individual cards are selectively movable support bars which support an entire file of cards at their side edges. The cards are engaged by the support bars above their centers of gravity so as to hang straight. Selected cards drop vertically out of the file. They may fall completely free of the file or they may be mounted so as to pivot out of but not free of the file. The latter form assures that the integrity of the file will be maintained.

Another object of the present invention is to provide a card selection system which embodies a plurality of individually operable selector bars capable of precision horizontal movement and uses a decimal identification code wherein the number of digits is limited solely by the width of the cards and the number of selector bars.

Other objects and many of the attendant advantages of the present invention will be readily appreciated as the invention becomes better understood by reference to the following detailed description when considered in connection with the accompanying drawings, wherein.

Figures 1, 2, 3:
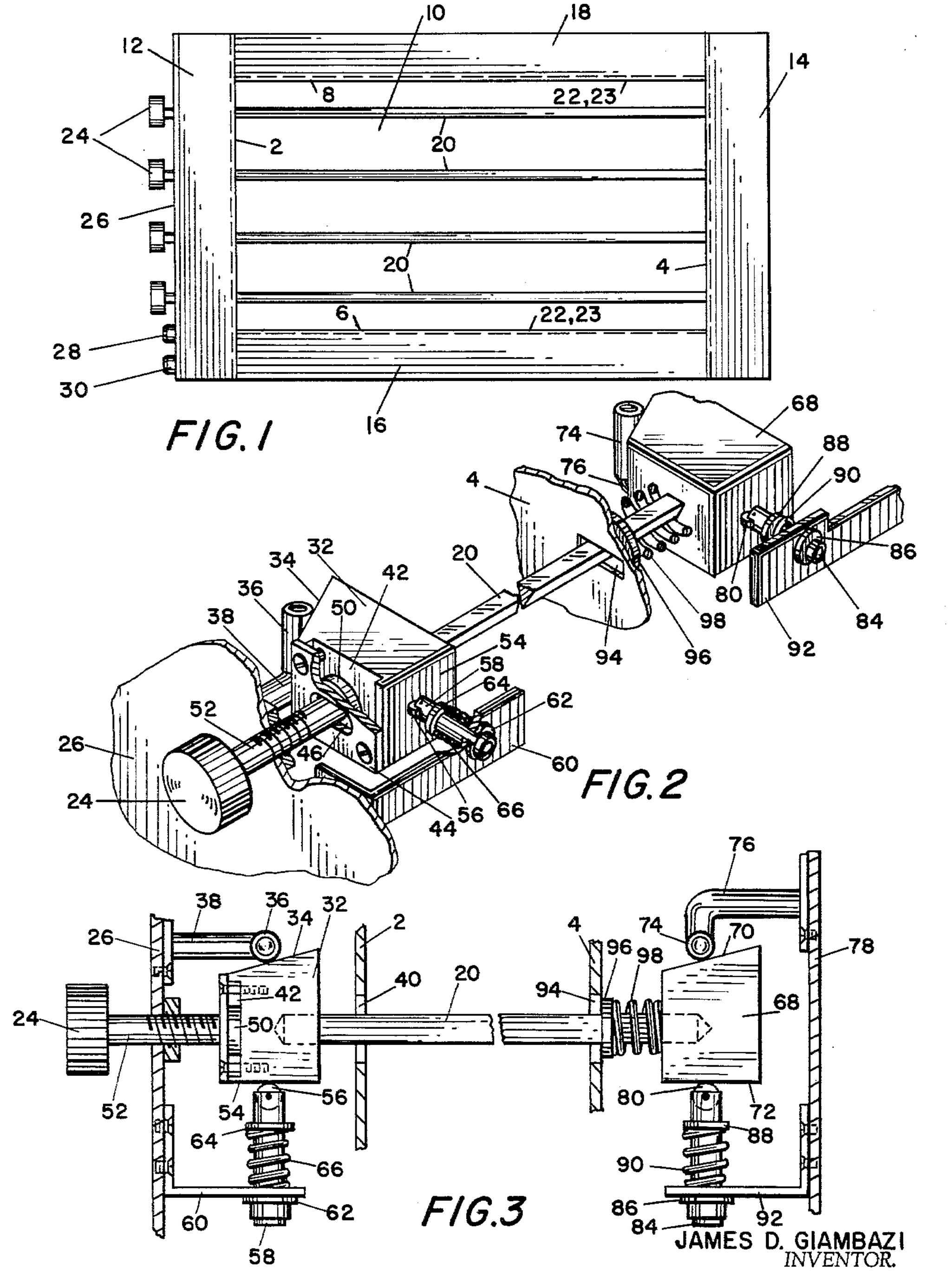
FIG. 1 is a plan view of apparatus embodying the present invention.
FIG. 2 is a fragmentary perspective view of one of the selector bar assemblies embodied in the apparatus of FIG. 1.
FIG. 3 is a fragmentary plan view of the apparatus of FIG. 2.
Figures 4, 5, 6, 7, 7A, 7B, 7C:
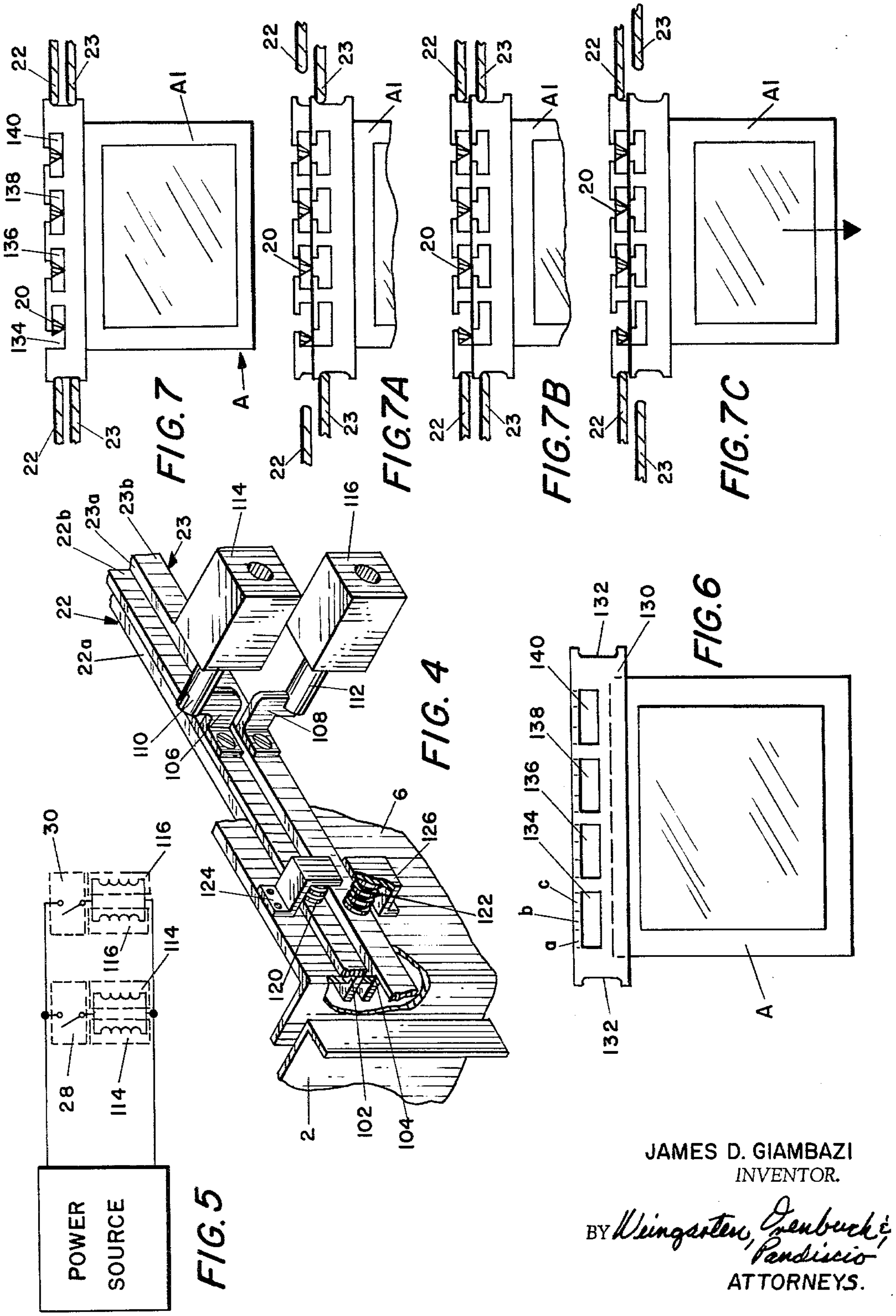
FIG. 4 is a fragmentary perspective view illustrating the disposition of a pair of retention bars which form part of the apparatus of FIG. 1.
FIG. 5 is a circuit diagram of the electrical controls embodied in the apparatus of FIG. 1.
FIG. 6 illustrates one form of uncoded card useable with the present invention.
Figure 8B:
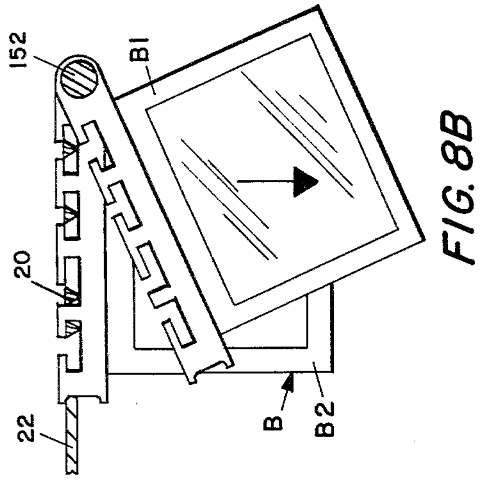
Figure 8A:
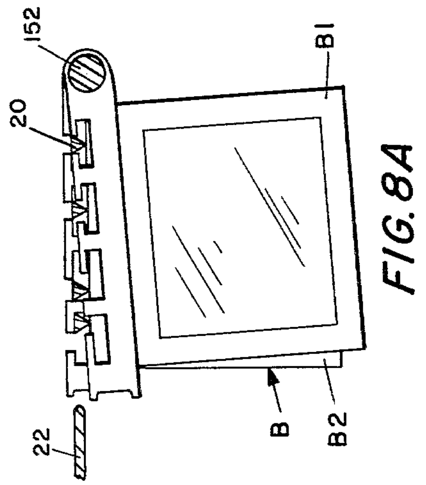
Figure 8:
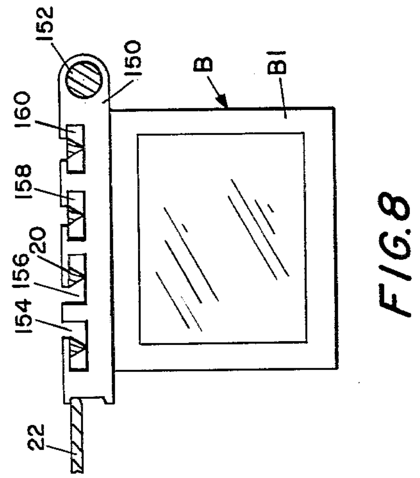
Figures 9, 10:
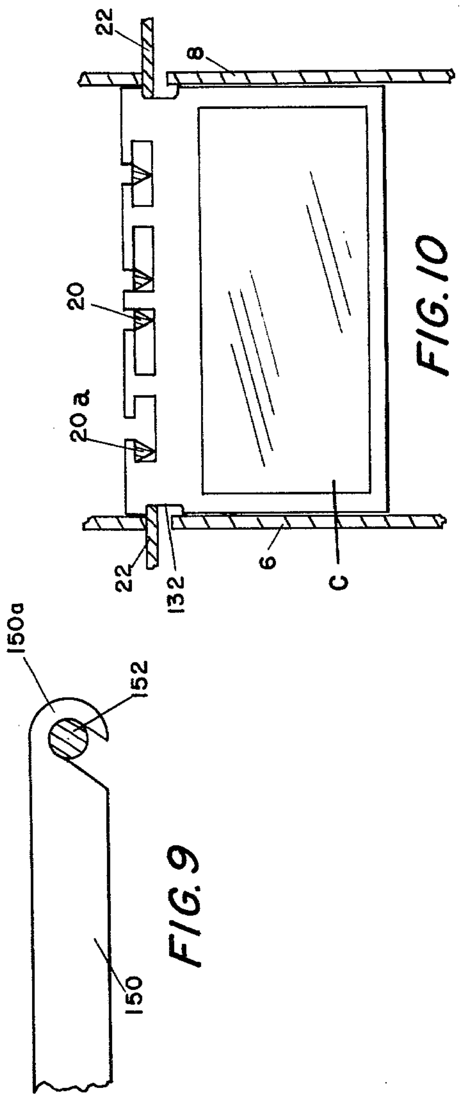
Figures 11, 12:
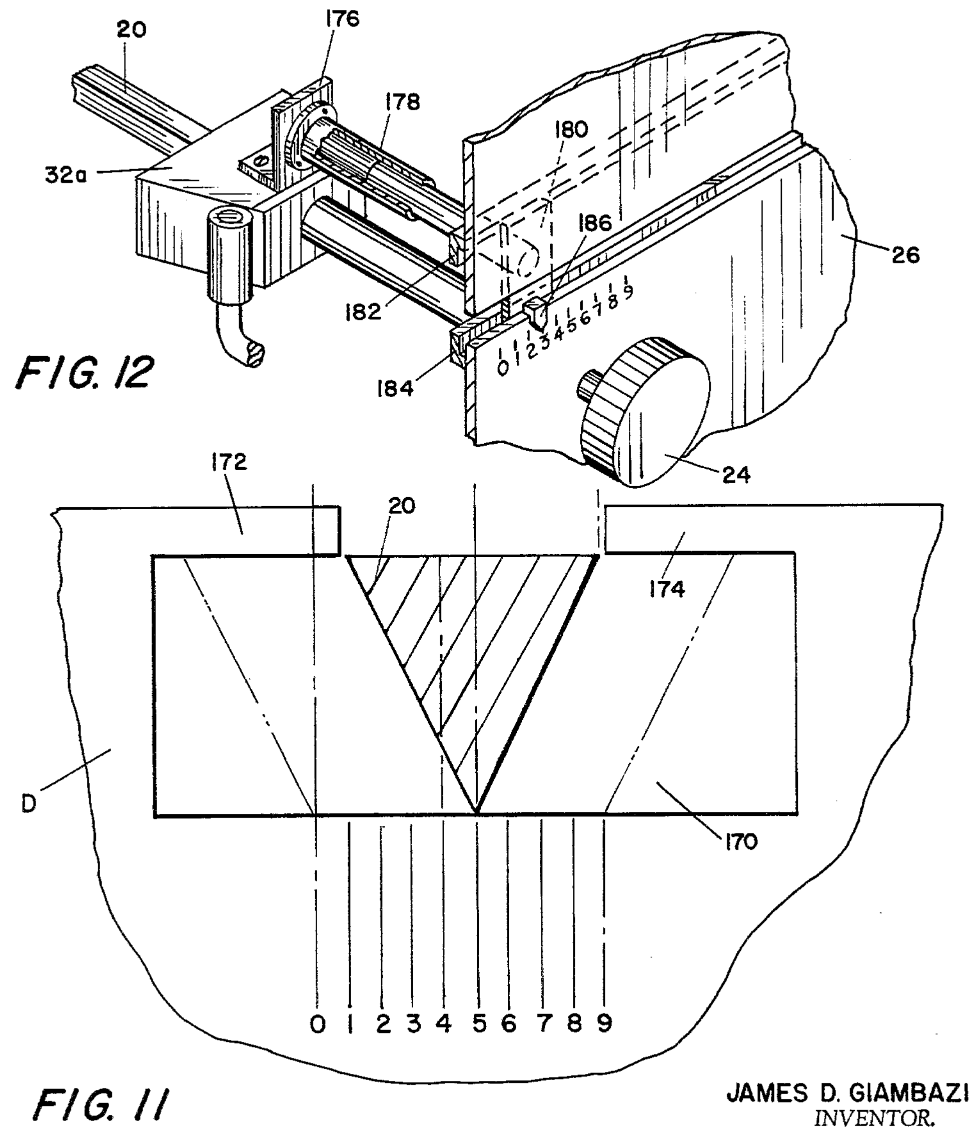

FIGS. 7, 7A, 7B, and 7C schematically illustrate the mode of operation of the apparatus of FIGS. 1–4 embodying cards of the form shown in FIG. 6;

FIGS. 8, 8A, and 8B illustrate the mode of operation of a second form of the present invetnion;

FIG. 9 illustrates a modified form of card hanger;

FIG. 10 illustrates another modification of the same invention;

FIG. 11 is an enlarged view of one of the code slots of a card constructed according to the present invention; and FIG. 12 is a fragmentary perspective view showing the apparatus of FIG. 1 adapted for use of decimal coded cards.

Referring now to FIG. 1, the illustrated apparatus comprises a front wall 2, a rear wall 4, and a pair of opposed side walls 6 and 8, which define an enclosed card storage space 10. The front and rear walls 2 and 4 form parts of front and rear enclosures 12 and 14 which house certain operating mechanisms hereinafter described. The side walls 6 and 8 form parts of side enclosures 16 and 18 respectively which also house certain operating members hereinafter described. Supported within the storage space 10 is a plurality of identical card selector bars 20 which are mounted in parallel spaced relation to each other. Also extending within the storage space 10 at opposite sides thereof are pairs of retention bars 22, 23. The selector bars 20 are operated by means of control knobs 24 located on the front side of a front cover panel 26. The retention bars 22, 23 are operated by means of solenoids contained within enclosures 16 and 18 and controlled by suitable push-button switches 28 and 30 which are mounted on front panel 26.

Referring now to FIGURES 2, 3, and 4, each selector bar 20 is of triangular cross-section. The forward end of each selector bar 20 is anchored in a cam follower block 32. Each cam follower block 32 is provided with an obliquely extending vertical surface 34 which is engaged by a roller cam 36 mounted on a bracket 38 affixed to the front panel 26. The cam blocks 32 are mounted forward of the front wall 2, the latter having a plurality of elongated horizontal slots 40 which allow the selector bars 20 to shift horizontally within precise limits. The forward end of each cam block 32 is provided with a milled slot 42. Releasably attached to each cam block in covering relation with its milled slot 42 is a plate 44 having an elongated horizontally extending slot 46 cut therein. Rotatably captivated within each milled slot 42 by its associated plate 44 is the flanged head 50 of a screw 52 which is mounted in a tapped aperture in the front panel 26. Control knobs 24 are attached to the forward ends of screws 52. Each cam follower block 32 also has a straight vertical surface 54 at the side opposite its aforementioned oblique vertical surface 34. Engaging each vertical surface 54 is a roller 56. Rollers 56 are attached to the ends of individual rods 58. Each rod 58 is mounted for axial movement in a separate L-shaped bracket 60 attached to the front panel 26. Each rod 58 is provided with two spaced flanges 62 and 64. The flange 62 limits movement of the rod toward cam block 32. The other flange 64 restrains a compression spring 66 which urges the roller 56 into continual engagement with the cam block 32.

The opposite end of each selector bar 20 is anchored in a second cam block 68. Although not shown, it is to be understood that the connection between rods 20 and cam blocks 32 and 68 is such that the distance between the fore and aft blocks may be adjusted to a precise amount. The second cam block 68 is provided with an oblique surface 70 and an opposed vertical surface 72 which correspond to the surfaces 34 and 54 of the forward cam block 32. Each oblique surface 70 is engaged by a cam roller 74 which is mounted on the end of a bracket 76 attached to a vertical rear panel 78 forming part of the rear end of the enclosure 14.

The vertical surfaces 72 of cam blocks 68 are continually engaged by rollers 80 mounted on the ends of axially movable rods 84. The latter are identical in construction to the corresponding forward rods 58, having flanges 86 and 88 and being associated with compression springs 90 which urge the rollers 80 into continual engagement with the cam blocks 68. Each rod 84 is supported by an L-shaped bracket 92 which is attached to the rear panel 78.

The selector bars 20 extend through elongated horizontal slots 94 formed in rear wall 4. Slots 94 correspond in size to the aforementioned elongated slots 40 provided in the front wall 2. Each selector bar 20 carries a washer 96 which is held in engagement with the back rear wall 4 by a compression spring 98. Compression springs 98 act through washers 96 to urge the cam blocks 68 away from rear wall 4. As a consequence, axial movement of bars 20 in a forward direction is opposed by compression spring 98.

Operation of selector bars 20 will be described now. When a screw 52 is rotated counterclockwise in front panel 26 (as viewed in FIG. 2), its associated cam blocks 32 and 68 will be drawn forward. Simultaneously, the two cam blocks will be urged laterally toward brackets 60 and 92 by cam rollers 36 and 74 acting on the oblique surfaces 34 and 70. Lateral movement of the cam blocks toward brackets 60 and 92 will be controlled by the opposing influence exerted by rods 58 and 84 which are urged in the opposite direction by compression springs 66 and 90. When the screws 52 are rotated clockwise, the selector bars 20 will move in the opposite direction that is, rearwardly and laterally away from the brackets 60 and 92. Rollers 56 and 80 act to keep the cam blocks in firm engagement with cam rollers 36 and 74.

Of course, the degree of movement of the cam blocks 32 and 68 and the selector rods 20 is controlled by the amount of rotation of the screws 52 and the pitch of the threads on the screws. According to the kind of thread which is provided, it is possible to provide fine or coarse adjustment of the selector bars. Having once been disposed in a desired position, the selector bars 20 will not move, being held against movement by screws 52 and also by the cam rollers 36 and 74 acting together with the rollers 56 and 80 and the springs 66 and 90.

One of the two pairs of retention bars 22, 23 are illustrated in greater detail in FIG. 4. Each retention bar 22, 23 has an L-shaped cross-section. The upper retention bar 22 comprises a horizontal portion **22*a* and an upwardly directed vertical portion 22*b*. The bottom retention bar 23 comprises a horizontally extending portion 23*a* and a downwardly extending vertical portion 23*b*. The horizontal portions of the two pairs of retention bars 22, 23 are disposed in horizontally extending slots 102 and 104, respectively, formed in each of the side walls 6 and 8. Each pair of retention bars 22, 23 has its vertical portions attached to brackets 106 and 108 which are affixed to the ends of the movable plungers 110 and 112 of separate solenoids 114 and 116, respectively. As seen in FIG. 5, the two solenoids 114 are connected in parallel with each other and in series with switch 28 and a suitable power source. The two solenoids 116 are connected in the same fashion with respect to switch 30. As long as the solenoids are deenergized, the retention bars are maintained with their horizontal portions 22*a* and 23*a* projecting through the side walls 6 and 8 into the storage space 10 (see FIGS. 1 and 4) by means of compression springs 120 and 122, respectively, which are captivated by suitable brackets 124 and 126, respectively, attached to the side walls. At least two compression springs are provided for each retention bar. When the solenoids are energized, their plungers will be drawn away from the side walls 6 and 8, thereby causing the retention bars 22, 23 to be retracted out of the storage space 10**.

The foregoing apparatus contemplates the use of a card embodying an identification code system which is capable of a relatively large number of different identification codes. Referring now to FIG. 6, there is illustrated a blank card A which is one form of card useable with the foregoing apparatus. The upper edge of blank card A is provided with a reinforcing hanger or support member 130 along its top edge. The support member 130 may be formed of any suitable material, as, for example, metal, plastic, or paperboard. The support member 130 is provided at its ends with vertically elongated notches 132 to accommodate the retention bars 22, 23. The notches form tabs which overlap and are supported by the top retention bars 22. The support member also is provided with four evenly spaced identical horizontally elongated apertures 134, 136, 138, and 140 for coding purposes. These apertures are rectangular in shape and are located below the upper edge of the support element. Coding of the card of FIG. 6 is accomplished by forming an entry slot for each of the apertures 134, 136, 138, and 140, each slot extending down from the upper edge of the support element. Solely for convenience of description, let it be assumed that the entry slot for each of the aforementioned apertures may be formed in any one of three separate locations, these separate locations being demarcated by dotted lines and identified by the designations *a, b*, and *c* in FIG. 6. Since each aperture may be coded three different ways, a relatively large number of distinct four-bit codes can be provided using only the four apertures 134, 136, 138, and 140. To be specific, four apertures permits a total of 81 four-bit codes. In other words, 81 different cards may be uniquely coded. Extension of the number of identification codes is accomplished by increasing the number of code apertures or by increasing the length of the code apertures so as to have more than three entry slot positions.

Referring now to FIGS. 7, 7A, 7B, and 7C, the mode of operation of the illustrated apparatus embodying cards of the form illustrated in FIG. 6 will now be described. For the purposes of this description, let it be imagined that a plurality of cards A are supported by the retention bars 22, 23, with all of the cards with the exception of the one first in line having entry slots located in the center code positions *b*. The first-in-line card is identified at A1; it has notches formed at the center positions *b* of apertures 136, 138, and 140. However, the entry slot for its aperture 134 is formed at position *a*. Let it be assumed further that the code for card A1 is known, that its location is unknown, and that it is desired to retrieve it from the file. The procedure of retrieving first involves positioning the selector bar associated with the apertures 134 at code position *a* and placing the remaining selector bars at code positions *b*. Having properly positioned the selector bars, the next step is to retract the top retention bars 22 by operation of switch 28. When this occurs, all of the cards except card A1 will remain suspended by virtue of the fact that the entry slots for their openings 134 will not be in alignment with the selector bar 20 associated therewith. Cooperating with the selector bar for the apertures 134 to retain all of the cards except card A1 in suspended position are the two retention bars 23 which remain in extended position. These bars coact with the ends of support members 130 to prevent the cards from pivoting about the selector bar associated with the openings 134. The card A1 will drop due to the fact that all of its entry slots are aligned with the selector bars. However, the extent to which card A1 will drop is limited by the retention bars 23. FIG. 7A illustrates how card A1 is retained by the retention bars 23 after it has dropped to a point below the level of the retracted tension bars 22. After the card A1 has dropped to the point illustrated in FIG. 7A, the top retention bars 22 are restored to their original position. When this is done, the bars reengage the opposed edges of the other cards which have been held suspended by the selector bar associated with apertures 134. Restoration of retention bars 22 to card supporting position is done so as to eliminate any chance of cards accidentally dropping out of the file on subsequent movement of the selector bars. As soon as the top retention bars 22 have been restored to card supporting position, the bottom retention bars 23 are withdrawn by operation of switch 30. As seen in FIG. 7C, retraction of bars 23 releases the selected card A1 so that it is free to drop out of the file. The retention bars 23 are restored to their normal position after card A1 drops out of the file. Obviously, in place of the simple manually controlled electrical system of FIG. 5, it is possible to substitute other systems which will operate the retention bars automatically in the sequence necessary to effect retrieval of a desired card.

Although the foregoing description assumed the situation where all of the cards had the same code except for card A1, and the latter differed only with respect to coding of aperture 134, it is to be understood that the system works equally well when all of the cards have different codes. The principle is the same—all cards except the correctly coded card or cards will be held up by one or more selector bars.

Of course, it is not necessary that the selected card be removed completely from the card file. In many situations, it may be desired simply to inspect the card briefly and then to restore it to the file. This has the advantage of assuring that the integrity of the file will be maintained. FIGS. 8, 8A, and 8B illustrate how this may be accomplished. In these figures, there is illustrated a stack of cards B which have edge support elements 150 that are rotatably attached at one end to a pivot bar 152 which extends along the length of the stack of cards. In this embodiment, bar 152 supplants one pair of retention bars 22 and 23. At the opposite side, the bottom retention bar 23 is omitted and only the top retention bar 22 is used. Coding of the cards B is accomplished in the same manner as the cards A previously described. In FIG. 8, the first card B1 in the stack B is provided with entry slots for its first two openings 154 and 156 at positions *c* and *a*, respectively. The other holes 158 and 160 of card B1 are provided with entry slots at positions *b*. Selection of card B1 is effected by first positioning the selector bars 20 according to the required code. Thereafter, the single retention bar 22 is withdrawn. As soon as bar 22 is pulled back, the card B1 will rotate down about the pivot established by the pivot bar 152. FIG. 8A illustrates the card B1 as it begins to pivot down. After the selected card has pivoted down, the retention bar is restored to its original position, as shown in FIG. 8B. While the retention bar 22 is in the position of FIG. 8A, all of the cards which are not coded in the required manner will be retained by one or more of the selector bars 20. Thus, in FIG. 8A, the second card B2 is illustrated hung up by the selector bar 20 associated with apertures 154. The remaining selector bars do not provide any support for card B2; however, they may support other cards in the stack.

It is to be observed that the mode of operation illustrated in FIGS. 8–8B can be accomplished using a different card pivot arrangement. Thus, as shown in FIG. 9, the card support member 150 may be formed with a hooked end 150*a* which fits onto the pivot rod 152 or an equivalent pivot support. The card support of FIG. 9 not only can pivot like the card support shown in FIGS. 8–8B, but it has the further advantage of permitting the cards to be lifted out of the file.

FIGS. 8, 8A, and 8B illustrate a further feature of the invention, namely, that it is not necessary to use two retention bars at each side of the stack of cards. A single retention bar to a side will suffice if it is not desired to interrupt downward movement of the selected card in the manner shown in FIGS. 7A and 7B. However, use of a single retention bar is contingent upon provision of means for preventing the card from shifting laterally or pivoting on the selector bars. In FIG. 8, bar 152 serves to anchor the cards so that they cannot shift laterally except to pivot in the manner previously described. In FIGS. 7–7C, the bottom retention bars 23 serve to guide cards so that they cannot shift laterally. Adequate guiding for the card may be provided by using means other than pivot support 152 or double retention bars 122, 123. Thus, as illustrated in FIG. 10, it is possible to employ a card C whose side edges will be engaged by the side walls 6 and 8 of the apparatus and to use only one set of retention bars 22. Withdrawal of the retention bars will not result in dropping of any of the cards unless the entry slots for the cards coincide exactly with the positions of the individual selector rods 20. If a card is supported by only one selector rod, it still will not drop since the side walls 6 and 8 will prevent it from shifting laterally or from pivoting about the single supporting selector rod. Therefore, although card C is supported by only a single selector bar 20*a* (the remaining selector bars 20 being positioned in registration with entry slots), on withdrawal of bars 22 the cards C will not pivot about the selector bar 20*a* since its side edges are proximate to the side walls 6 and 8. Since the card C must remain stationary, return of the retention bars 22 into its notches 132 will be accomplished without difficulty.

An advantage of the present invention is that it permits coding on a decimal basis. As indicated previously, the selector bars 20 can be moved in a very precise manner, the screw elements 52 permitting adjustment approximating that of a micrometer. Thus, it is possible to view the elongated rectangular code openings in the individual cards as comprising ten different code positions. This is illustrated in FIG. 11 where a code aperture 170 of a card D is graduated into ten different positions. Associated therewith is a selector bar 20. If the selector bar 20 is moved in either direction one position away from the center position illustrated in FIG. 11, it will act to support an overhanging lip 172 or 174, as the case may be, thereby preventing the card from dropping. Based on the concept illustrated in FIG. 11, it has been contemplated to provide means for indicating to the operator the exact position of the selector bars so that the operator may selectively position the bars in any one of ten different positions. FIG. 12 illustrates one form of indicator construction which may be provided to facilitate precise positioning of a selector bar. In this figure, the forward cam block 32*a* is provided with a bracket 176 which supports one element of a telescoping unit identified generally at 178. The other element of the telescopic unit is attached to a rectangular plate 180 which is disposed behind the forward panel 26 in a channel defined by two L-shaped angle irons 182 and 184. The plate 180 is provided with an offset pointer 186 which projects through a slot in the panel 26. Also provided on the panel 26 is a series of graduations numbered from zero to nine. When the cam block is caused to move through operation of the control knob 24, the pointer will move in a direction determined by the direction of rotation of the knob. Thus, it is an easy matter for the operator to selectively position the selector bar at any one of the ten different positions indicated on the front face of the panel. With this arrangement, it is possible to code cards in a decimal fashion, with the different selective bars representing units, tens, hundreds, thousands, etc. Therefore, in the illustrated embodiment of FIG. 1, the four selector bars can be operated to select any of ten thousand cards each having a different decimal code. This is believed to be a tremendous advantage in view of the comparative simplicity of the illustrated device.

Of course, it is also recognized that the illustrated device may be used for binary indications, in which case each selector bar would have only two possible positions, one position representing zero and the other position representing one. With a binary arrangement, four selector bars will provide a code capacity of 16 codes. This reduced capacity compared to decimal coding is offset by the fact that the overall width of the card can be reduced. However, in view of the fact that the selector bars and the associated mechanisms occupy a substantial space, there is a practical limit as to the extent to which the code apertures may be condensed in spacing. It is for this reason that decimal coding offers distinct advantages over binary coding.

Although it is preferred that the selector bars 20 have a triangular cross-section, it is to be appreciated also that their cross-sections may have some other configuration, as, for example, trapezoidal, rectangular, circular, and even semi-circular. A trapezoidal configuration is a satisfactory alternative configuration since it provides downwardly converging sides like the triangular bars 20. The downwardly converging sides facilitate the pivotal action illustrated in FIGS. 8–8B. A semi-circular configuration wherein the flat diametrical surface of the bar is horizontal and on top also is a most satisfactory alternative. Circular selector bars are less satisfactory since they lack a sharp edge for catching and supporting the tabs formed by the entry slots. As a consequence, circular bars do not permit entry slots to be located as precisely as contemplated in FIG. 11, but require a coarser scale in order to provide accurate selection. Rectangular bars can be used with most all forms of the invention, except that they do not function too well in a system involving pivotal action (FIGS. 8–8B). However, they can be used even in a pivotal system if a somewhat coarser selection is tolerable. Reducing the number of permissible entry slot positions per code aperture and making the entry slots slightly oversize while still locating them with great precision are expedients which improve the results obtainable with rectangular selector bars.

It is believed to be apparent from the foregoing discussion and the accompanying illustrations that the present invention is simple, is functionally reliable in view of its simplicity and the organization of the codes on the cards, has high data storage capacity since the individual cards may bear information in any one of various forms, and has a very large code storage capacity. Relative to the form of information stored on the cards, it is recognized that the cards may be adapted to include photographic material. Thus, for example, the card may consist of a coded rectangular paperboard frame with a film document inserted in the frame. It is also contemplated that information may be stored on the cards by writing or printing, by coding, by magnetic recording, and also by punching holes according to conventional punched card techniques. The use of a reinforcing element along one edge of the cards will depend upon the nature of the material of which the card is constructed. If the card is made of a relatively flexible material, then use of an edge support is advised. Otherwise it may be omitted. The essential object is to provide a data handling card which is simple, has a minimum thickness and lightness, has sufficient flexibility to permit handling, and which will resist shrinkage, distortion by humidity changes, and corrosion.

Obviously, many modifications and variations of the present invention are possible in the light of the above teachings. It is to be understood, therefore, that the invention is not limited in its application to the details of construction and arrangement of parts specifically described or illustrated, and that within the scope of the appended claim, it may be practiced otherwise than as specifically described or illustrated.

I claim:

Apparatus for retrieving a desired data bearing card from a stack of data bearing cards, each of said cards having a top edge, a pair of opposed side edges, a notch in each of said side edges below said top edge, a plurality of apertures formed in said cards and aligned with said top edge, and slots extending between said top edge and each of said apertures positioned in accordance with a preselected identification code for each of said cards, said apparatus comprising in combination:

a pair of top support members and a pair of bottom support members each pair being movable between an engaging position with said notches and a nonengaging position therewith;

each of said support members when in said engaging position being in close proximity to the vertical edges of said notches, the spacing between adjacent top and bottom support members being less than the vertical length of said notches so that a top and bottom support member may be engaged in each notch at the same time, said cards being suspended by said top support members when they are in engaging position and when said top support members are in a nonengaging position said cards are free to fall while said bottom support members are in engaged position until the upper edges of said notches engage said bottom support member and are suspended by them, said top support members being disposed above the top edges of cards suspended by said bottom support members;

a plurality of parallel selector bars, each extending through a respective aperture in each card, each of said bars being movable between a nonaligned position with said slot which extends from said top edge and an aligned position with said slot;

card selector means for moving, in accordance with the preselected code of said desired card, particular ones of said selector bars into alignment with said slots of said desired cards; and retrieval control means for initially positioning said top and bottom support members into engaging positions with said notches when all of said cards are suspended from said top support members and for thereafter moving said top support members from said engaging position to said nonengaging position wherein said desired cards fall until they are supported by said bottom support members and for thereafter moving said top support members back to said engaging position wherein said top support members engage the other cards above the top edges of the desired card and for thereafter moving said bottom support members from said engaging position to said nonengaging position and back again to said engaging position wherein said desired cards fall free of the stack.

References Cited by the Examiner

UNITED STATES PATENTS

| | | | |
|---|---|---|---|
| 1,591,327 | 7/1926 | Kraut et al. | 129—16.1 |
| 2,647,519 | 8/1953 | Broxton | 129—16.1 |

FOREIGN PATENTS

| | | |
|---|---|---|
| 1,047,257 | 7/1953 | France. |
| 669,728 | 1/1939 | Germany. |
| 307,432 | 1/1930 | Great Britain. |
| 614,436 | 12/1948 | Great Britain. |

JEROME SCHNALL, *Primary Examiner.*